(12) United States Patent
Pavone

(10) Patent No.: US 9,983,084 B2
(45) Date of Patent: May 29, 2018

(54) PRESSURE SENSING ASSEMBLY FOR STRUCTURAL HEALTH MONITORING SYSTEMS

(71) Applicant: STMICROELECTRONICS S.R.L., Agrate Brianza (IT)

(72) Inventor: Mario Giuseppe Pavone, Giarre (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days. days.

(21) Appl. No.: 15/175,726

(22) Filed: Jun. 7, 2016

(65) Prior Publication Data

US 2017/0234753 A1 Aug. 17, 2017

(30) Foreign Application Priority Data

Feb. 16, 2016 (IT) .................. 102016000015880

(51) Int. Cl.
*G01L 19/14* (2006.01)
*G01L 19/00* (2006.01)

(52) U.S. Cl.
CPC .................... *G01L 19/14* (2013.01)

(58) Field of Classification Search
CPC ............... G01L 19/14; G01D 11/245
See application file for complete search history.

(56) References Cited

U.S. PATENT DOCUMENTS

| | | | | |
|---|---|---|---|---|
| 4,709,342 A * | 11/1987 | Hosoda | ................ | G01L 1/16 310/338 |
| 4,739,666 A * | 4/1988 | Hafner | ................ | B29C 37/006 29/454 |
| 4,884,223 A * | 11/1989 | Ingle | ................ | G01L 1/22 702/41 |
| 6,227,055 B1 * | 5/2001 | Pitzer | ................ | G01L 19/0061 73/715 |
| 6,615,669 B1 * | 9/2003 | Nishimura | ................ | G01L 19/0038 73/706 |
| 7,162,927 B1 * | 1/2007 | Selvan | ................ | G01L 19/0084 73/706 |
| 9,625,333 B2 * | 4/2017 | Jentoft | ................ | G01L 5/16 |

FOREIGN PATENT DOCUMENTS

| | | | | |
|---|---|---|---|---|
| WO | 2013/003789 A1 | 1/2013 | | |
| WO | WO 2013003789 A1 * | 1/2013 | ........... | G01L 9/0072 |

* cited by examiner

*Primary Examiner* — Harshad R Patel
*Assistant Examiner* — Jamel Williams
(74) *Attorney, Agent, or Firm* — Seed Intellectual Property Law Group LLP

(57) ABSTRACT

A pressure sensing assembly includes: a substrate; a pressure sensor on the substrate; a package, the substrate and the pressure sensor being embedded in the package; and a pressure adapter, with a first interface, external to the package and having a first area, and a second interface, coupled to the pressure sensor and having a second area, different from the first area. The pressure adapter is configured to transfer a force between the first interface and the second interface so that a pressure on the second interface is different from a pressure on the first interface.

19 Claims, 4 Drawing Sheets

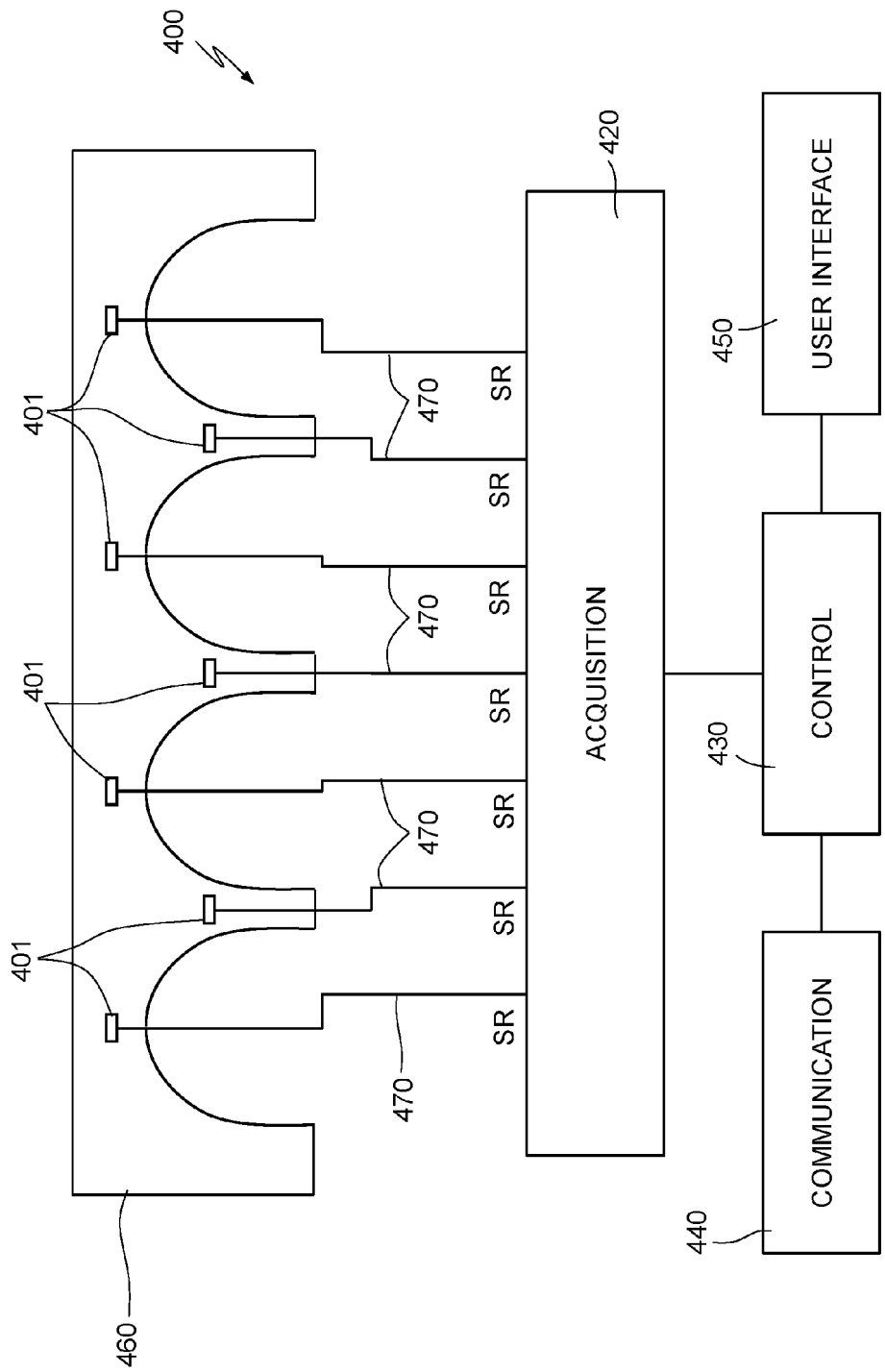

PRESSURE SENSING ASSEMBLY FOR STRUCTURAL HEALTH MONITORING SYSTEMS

BACKGROUND

Technical Field

The present disclosure relates to a pressure sensing assembly for structural health monitoring systems.

Description of the Related Art

As is known, structural-health monitoring (SHM), namely monitoring of the state of structural integrity, in particular, of concrete buildings, specifies the use of sensors of various natures, such as pressure sensors, strain gauges, temperature sensors, and so forth. The sensors are connected in communication with a sensing station, where the measurements made are monitored, analyzed, and stored.

Some of the sensors, for instance pressure sensors and/or strain gauges, may be advantageously embedded in the concrete at reference positions to keep the state of stress of the material under control or at least suitably monitored. Pressure sensors currently available to be embedded in concrete are normally provided by regions of piezoresistive material deposited on a membrane or a substrate that may undergo deformation as a result of the pressure applied. The regions of piezoresistive material may be applied directly on the membrane using thick-film screen-printing techniques and may be connected in Wheatstone-bridge configuration.

Known sensors present, however, some limitations, in particular with regards to sensitivity in certain operating ranges. For instance, in conditions of relatively low pressure (a few megapascals) the sensitivity may not be sufficient to enable measurements to be carried out with the precision specified for the purposes of structural monitoring.

BRIEF SUMMARY

One or more embodiments provide a pressure sensing assembly. The pressure sensing assembly may be utilized in a monitoring system, such as a system for monitoring the structural health of a building, such as concrete buildings. One embodiment is directed to a pressure sensing assembly comprising a substrate and a pressure sensor on the substrate. The pressure sensing assembly further comprises a package. The substrate and the pressure sensor are embedded in the package. A pressure adapter is also provided. The pressure adapter has a first interface that is external to the package and a second interface coupled to the pressure sensor. The first interface has a first area, while the second interface has a second area. The second area is different from the first area. The pressure adapter is configured to transfer a force between the first interface and the second interface so that a pressure on the second interface is different from a pressure at the first interface.

BRIEF DESCRIPTION OF THE SEVERAL VIEWS OF THE DRAWINGS

For a better understanding of the disclosure, some embodiments thereof will now be described purely by way of non-limiting example and with reference to the attached drawings, wherein:

FIG. 8 is a simplified block diagram of a structural health monitoring system including a pressure sensing assembly according to one embodiment of the present disclosure.

DETAILED DESCRIPTION

Figure 1:
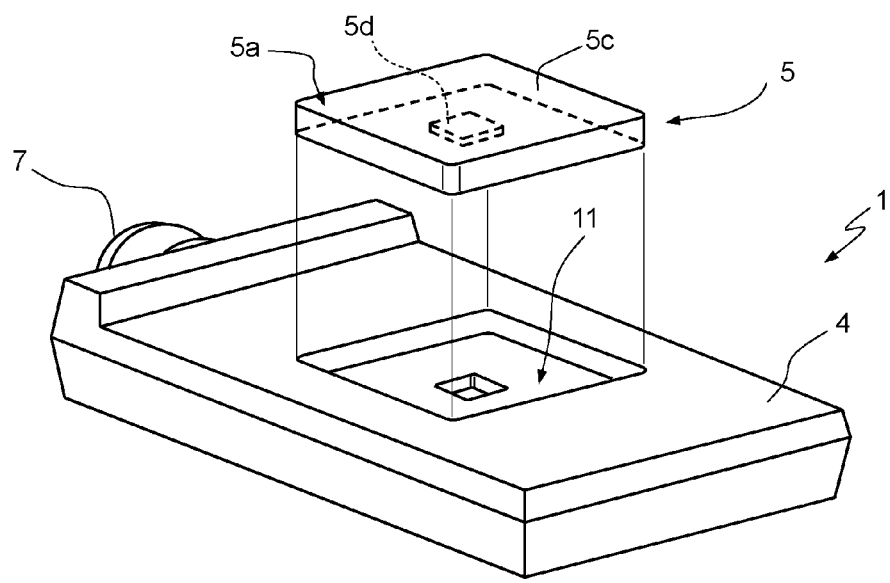
FIG. 1 is a perspective view from above of a pressure sensing assembly in exploded view according to one embodiment of the present disclosure.
Figure 2:
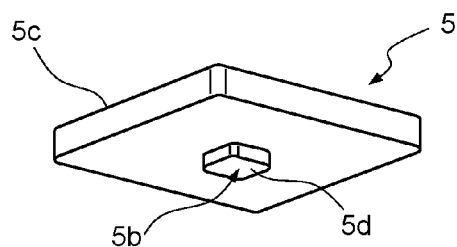
FIG. 2 is a perspective view from beneath of a pressure adaptor of the pressure sensing assembly of FIG. 1.
Figure 3:
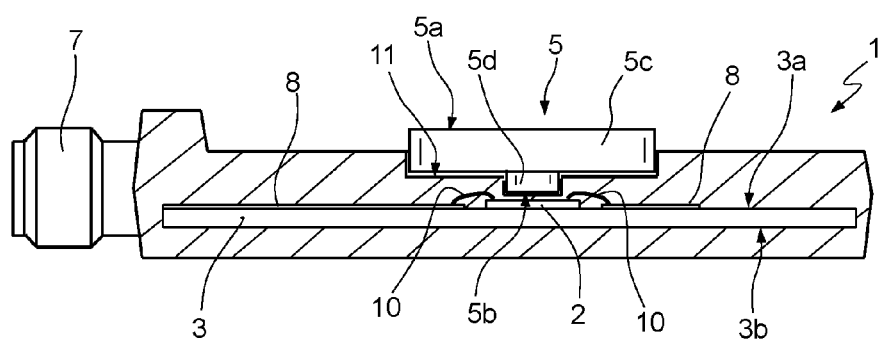
FIG. 3 is a longitudinal cross-section of the pressure sensing assembly of FIG. 1.

With reference to FIGS. 1-4, number 1 designates as a whole a pressure sensing assembly, in particular for use in a system for monitoring structural health of concrete buildings. Even though the sensing assembly 1 is particularly suitable for the application referred to, its use is not, however, limited to this sector and may be used in other suitable applications.

The pressure sensing assembly 1 comprises a pressure sensor 2, a substrate 3, a package 4, and a pressure adapter 5, which is coupled to the pressure sensor 2.

The pressure sensor 2 may be, by way of non-limiting example, a sensor of a piezoresistive type in Wheatstone-bridge configuration. In one embodiment, the pressure sensor 2 may be formed in a semiconductor chip bonded to the substrate 3. Alternatively, the pressure sensor 2 may be formed directly on the substrate 3, for instance using thick-film screen-printing techniques. The pressure sensor 2 has a sensitive region 2a that responds to pressure variations by modifying an electrical parameter, in this case the resistance of piezoresistive elements (not illustrated).

The substrate 3 is of a material with high Young's modulus, for instance a ceramic material, and has a first face 3a, on which the pressure sensor 2 is arranged, and a second face 3b, opposite to the first face 3a. A connector 7 is mounted on the substrate 3 and is electrically coupled to the pressure sensor 2 through conductive connection lines 8 formed on the first face 3a of the substrate 3 and wire bondings 10. The connector 7 enables electrical coupling and transmission of information between the pressure sensor 2 and an external sensing station, here not illustrated.

The pressure sensor 2, the substrate 3, the connection lines 7, and the wire bondings 10 are embedded in the package 4. In one embodiment, the package 4 is defined by a substantially parallelepipedal body of resin, obtained by molding. The package 4 incorporates completely the pressure sensor 2 and the substrate 3 and enables access to the connector 7. Furthermore, the package 4 has a seat 11 in which the pressure adapter 5 is housed.

Figure 4:
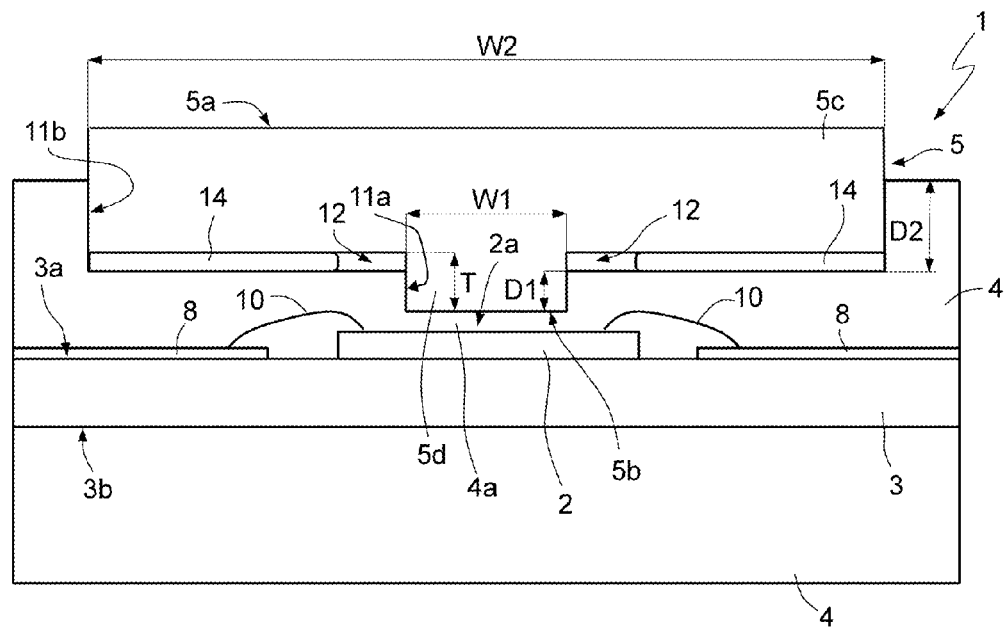
FIG. 4 is an enlarged longitudinal cross-section of a portion of the pressure sensing assembly of FIG. 1.

In greater detail and with reference to FIG. 4, the seat 11 is formed in the package 4, on the side of the substrate 3 on which the pressure sensor 2 is arranged. The seat 11 is defined by a first recess 11a, having a first depth D1 and a first width W1, and a second recess 11b, having a second depth D2 and a second width W2 larger than the first width W1. The first recess 11a is provided on the bottom of the second recess 11b, in a region corresponding to the position of the sensitive region 2a of the pressure sensor 2. In one embodiment, the first recess 11a and the second recess 11b have a substantially quadrangular, in particular square, shape, possibly with rounded corners. The pressure sensor 2 is arranged between the substrate 3 and the bottom of the first recess 11a and is entirely embedded in the resin of the package 4, as likewise the wire bondings 10.

The pressure adapter 5 is configured to transfer a force between a first interface 5a, of a first area, and a second interface 5b, of a second area that is smaller than the first area so that the pressure on the second interface 5b is higher than the pressure on the first interface 5a. The first interface 5a is also a sensing interface of the pressure sensing assembly 1.

In one embodiment, the pressure adapter 5 is defined by a rigid plate 5c having a protrusion 5d on one face and is of a material with a Young's modulus higher than the Young's modulus of the material that forms the package 4. For instance, the pressure adapter 5 may be of a metal material or a metal alloy, such as steel, while the package 4 is a resin material.

In greater detail, the rigid plate 5c has a substantially quadrangular shape and is housed in the second recess 11b with minimum clearance, in practice with a shape fit. The thickness of the rigid plate 5c may be greater than the depth of the second recess 11b so that the rigid plate 5c may project. A face of the rigid plate 5c opposite to the protrusion 5d defines the first interface 5a of the pressure adapter 5 and is accessible from outside the package 4.

The protrusion 5d is housed in the first recess 11a of the seat 11 with minimum clearance, in practice with a shape fit. One face of the protrusion 5d is in contact with the bottom of the first recess 11a and defines the second interface 5b of the pressure adapter 5. The protrusion 5d is separated from the pressure sensor 2 by a spacer portion 4a of the package 4. The spacer portion 4a, which is thin, but less rigid than the pressure adapter 5, enables even distribution of the load on the sensitive region 2a of the pressure sensor 2, compensating possible planarity errors of the second interface 5b and/or assembly errors of the pressure sensor 2.

The rigid plate 5c and the protrusion 5d are sized for obtaining the desired pressure-conversion ratio. In particular, denoting by A1 the area of the first interface 5a, by A2 the area of the second interface 5b, by P1 the pressure on the first interface 5a and by P2 the pressure on the second interface 5b, we have $$P2 = \frac{A1}{A2} P1$$

In the present case, given that the area A1 of the first interface 5a is larger than the area A2 of the second interface 5b, the pressure P2 on the second interface is greater than the pressure P1 on the first interface. The ratio A1/A2 between the areas of the first interface 5a and of the second interface 5b may be higher than 10, for instance, comprised between 20 and 50. In one embodiment, the rigid plate 5c and the protrusion 5d have a substantially square shape with a side equal, respectively, to the second width W2 of the second recess 11b, for instance 13.8 mm, and to the first width W1 of the first recess 11a, for instance 2.8 mm. In this case, the area ratio A1/A2 is approximately 24.3.

The protrusion 5d has a thickness T greater than the depth D of the first recess 11a. The thickness T is here understood as the distance between the face of the protrusion 5d that defines the second interface 5b and the face of the rigid plate 5c opposite to the first interface 5a.

As a result of the greater thickness T of the protrusion 5d with respect to the depth D of the first recess 11a (for example, 3 mm and 2.8 mm, respectively, in one embodiment), the rigid plate 5c is separated from the bottom of the second recess 11b by a gap 12 (of 0.2 mm, in the example illustrated). More precisely, the gap 12 is arranged between the bottom of the second recess 11b and the face of the rigid plate 5c, extending from which is the protrusion 5d. Adhesive regions 14 occupy a part of the gap 12 without filling it completely and withhold the pressure adapter 5 in the seat 11. The adhesive regions 14 extend along the perimeter of the rigid plate 5c, leaving a portion of the gap 12 around the protrusion 5d free. The adhesive regions 14 are of a compliant adhesive material, having a Young's modulus much lower than the Young's modulus of the material that forms the package 4 to avoid opposing appreciable resistance to the pressure adapter 5 when a pressure is exerted from outside. Ratios of 1:10 or less between the Young's modulus of the material that forms the adhesive regions 14 and the Young's modulus of the material that forms the package 4 enable transmission of the load applied from the first interface 5a to the second interface 5b and thus to the pressure sensor 2 substantially without any interference.

The pressure sensing assembly 1 described advantageously enables an improvement of the sensitivity in conditions of low pressure of the operating ranges of pressure sensors, due to the multiplying effect afforded by the pressure adapter 5. The pressure adapter 5, in fact, concentrates the stress on the sensitive region 2a of the pressure sensor 2, which is subjected to stresses in a region of the operating range with high sensitivity (20-50 MPa), even in the presence of a relatively low external pressure (1-2 MPa).

The main shape fit between the protrusion 5d and the first recess 11a combined with the auxiliary shape fit between the rigid plate 5c and the second recess 11b provide guidance for the micro-movements of the pressure adapter 5 precisely, favoring correct transmission to the pressure sensor 2 of the load applied on the first interface 5a.

Figure 5:
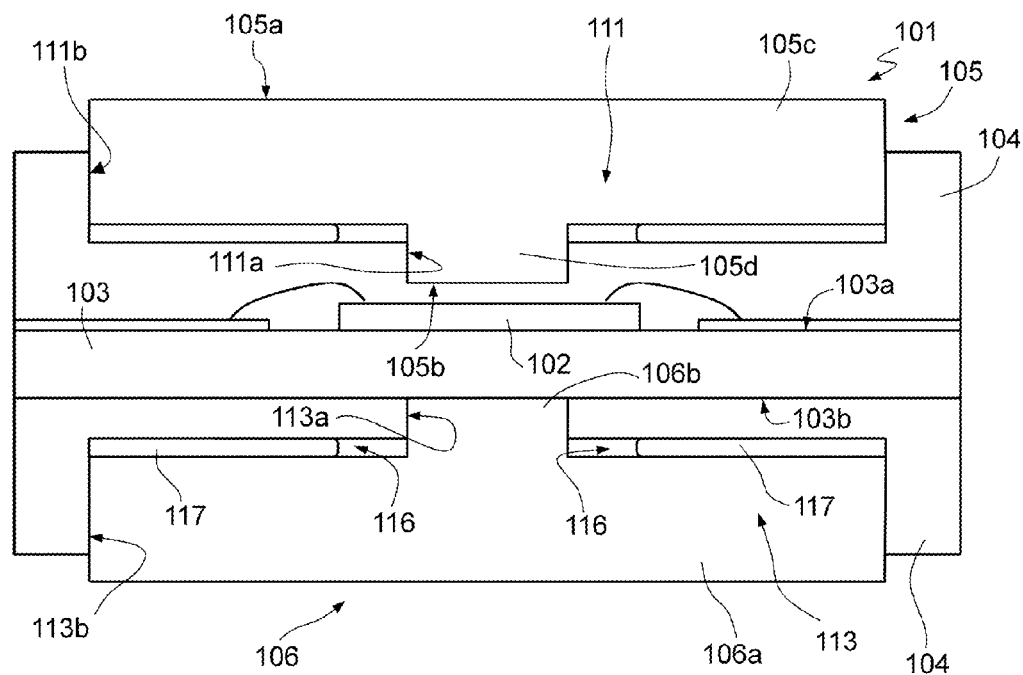
FIG. 5 is a longitudinal cross-section of a portion of a pressure sensing assembly according to a different embodiment of the present disclosure.

According to the embodiment illustrated in FIG. 5, a pressure sensing assembly 101 comprises a pressure sensor 102, a substrate 103, a package 104, and a pressure adapter 105, which is coupled to the pressure sensor 102. The pressure sensor 102, the substrate 103, and the pressure adapter 105 are of the type already described with reference to FIGS. 1-4. The pressure adapter 105 is configured to transfer a load between a first interface 105a, of larger area, and a second interface 105b, of smaller area, which is coupled to the pressure sensor 102 so that the pressure on the second interface 105b is higher than the pressure on the first interface 105a. In particular, the pressure adapter 105 is defined by a rigid plate 105c having a protrusion 105d on one face and is housed in a seat 111 of the package 104 defined by a first recess 111a and a second recess 111b. The first interface 105a and the second interface 105b are defined, respectively, by a face of the rigid plate 105c opposite to the protrusion 105d and by a face of the protrusion 105d opposite to the rigid plate 105c.

The pressure sensing assembly 101 further comprises a contrast element 106, which, in the embodiment of FIG. 5, has substantially the same shape as the pressure adapter 105 and is defined by a rigid plate 106a provided with a protrusion 106b on one face. In addition, the contrast element 106 may be of the same material of which the pressure adapter 105 is made. The pressure adapter 105 and the contrast element 106 are opposite with respect to the substrate 103. In particular, the pressure adapter 105 is adjacent to a first face 103a of the substrate 103, whereas the contrast element 106 is adjacent and, in one embodiment, contiguous to a face 103b of the substrate 103 opposite to the face 103a. The contrast element 106 is housed in a seat 113 defined by a first recess 113a and by a second recess 113b. The first recess 113a is substantially aligned to the first recess 111a of the seat 111, is defined on the bottom of the second recess 113b, and extends as far as on the second face 103b of the substrate 103.

The protrusion 106b of the contrast element 106 is housed in the first recess 113a and is in contact with the second face 103b of the substrate 103. The protrusion 106b of the contrast element 106 is thus aligned with the protrusion 105d of the pressure adapter 105.

The protrusion 106b has a thickness greater than the depth of the first recess 113a of the seat 113, and thus a gap 116 separates the rigid plate 106a from the bottom of the second recess 113b. Adhesive regions 117 occupy a part of the gap 116 without filling it completely and withhold the contrast element 106 in the seat 113.

The contrast element 106 has the effect of stiffening the structure of the pressure sensing assembly 101, attenuating the effects due to the lower stiffness of the material that forms the package 104. Use of the contrast element 106 further increases sensitivity.

Figure 6:
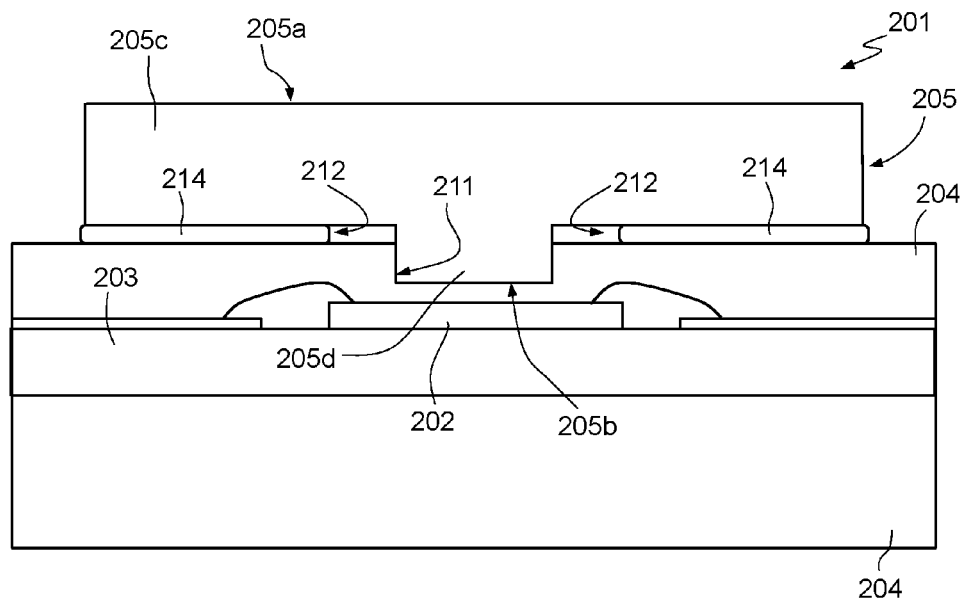
FIG. 6 is a longitudinal cross-section of a portion of a pressure sensing assembly according to a further embodiment of the present disclosure.

In one embodiment, illustrated in FIG. 6, a pressure sensing assembly 201 comprises a pressure sensor 202, a substrate 203, a package 204, and a pressure adapter 205, which is coupled to the pressure sensor 202. The pressure sensor 202, the substrate 203, and the pressure adapter 205 are of the type already described with reference to FIGS. 1-4. The pressure adapter 205 is configured to transfer a load between a first interface 205a, of greater area, and a second interface 205b, of smaller area, which is coupled to the pressure sensor 202 so that the pressure on the second interface 205b is higher than the pressure on the first interface 205a. In particular, the pressure adapter 205 is defined by a rigid plate 205c having a protrusion 205d on one face. The first interface 205a and the second interface 205b are defined, respectively, by a face of the rigid plate 205c opposite to the protrusion 205d and by a face of the protrusion 205d opposite to the rigid plate 205c.

In this case, a seat 211 for the pressure adapter 205 is defined by a single recess in the package 204, which is provided in a region adjacent to the pressure sensor 202 and receives the protrusion 205d with a shape fit. The shape fit, even just between the protrusion 205d and the seat 211, is sufficient for precisely guiding the micro-movements of the pressure adapter 205 and transferring the load effectively between the first interface 205a and the pressure sensor 202 through the second interface 205b.

The protrusion 205d has a thickness greater than the depth of the recess defining the seat 211, and thus a gap 212 separates the rigid plate 205c from an outer face of the package 204. Adhesive regions 214 occupy a part of the gap 212 without filling it completely and withhold the pressure adapter 205 in the seat 212. The adhesive regions 214 are of a material having a Young's modulus much smaller than that of the package 204 so as not to interfere with transmission of the load from the first interface 205a of the pressure adapter 205 to the pressure sensor 202.

Figure 7:
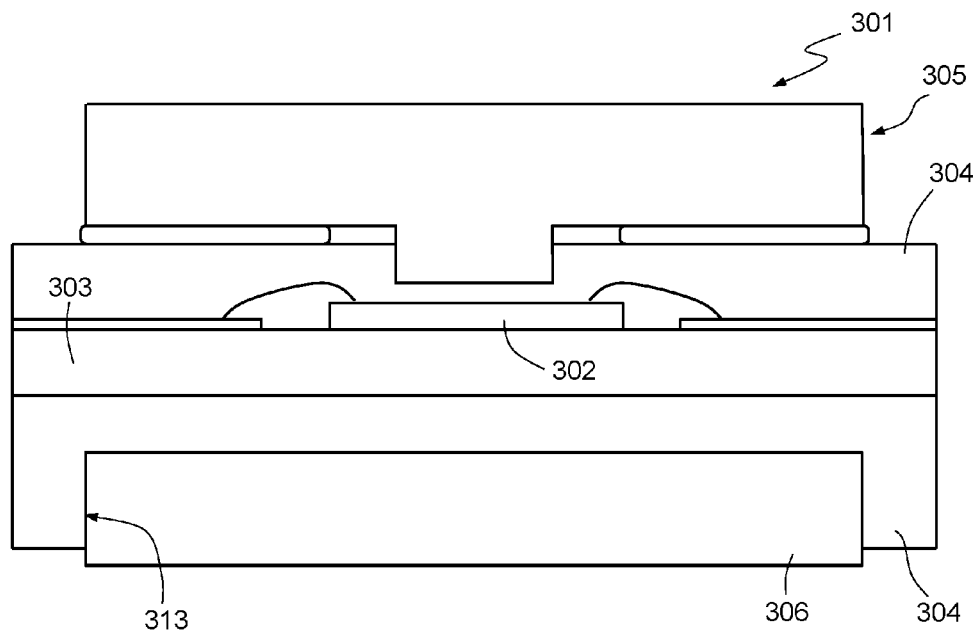
FIG. 7 is a longitudinal cross-section of a portion of a pressure sensing assembly according to a further embodiment of the present disclosure.

According to one embodiment, illustrated in FIG. 7, a pressure sensing assembly 301 comprises a pressure sensor 302, a substrate 303, a package 304, and a pressure adapter 305, which is coupled to the pressure sensor 302. The pressure sensing assembly 301 differs from the pressure sensing assembly 201 of FIG. 6 by the presence of a contrast element 306 opposite to the pressure adapter 305 with respect to the substrate 303. The contrast element 306 is defined by a rigid plate housed in a seat 313 and may be separated from the substrate 303 by a portion of the package 304, as in FIG. 7, or else be directly in contact with the substrate 303, in an embodiment not illustrated.

In FIG. 8, the reference number 400 designates a system for structural-health monitoring (SHM) for buildings, in particular concrete buildings.

The SHM system 400 comprises a plurality of pressure sensing assemblies 401, an acquisition unit 420, a control unit 430, a communication module 440, and a user interface 450.

The pressure sensing assemblies 401 may, for instance, be of any one of the types described previously and are embedded in concrete structures of a building 460, in respective monitoring positions. The pressure sensing assemblies 401 are further connected in communication with the acquisition unit 420 through respective connection lines 470, which may also provide electric power supply, if necessary, and enable sending of read signals SR. In one embodiment, the read signals SR may be generated by the acquisition unit 420 in the form of periodic currents or voltages at a controlled frequency and allow to determine of the state of an electrical parameter of the pressure sensing assemblies 401 indicating the internal stresses of the concrete structures of the building 460 in the respective monitoring position.

The measurements made by the acquisition unit 420 through the read signals SR may be processed by the control unit 430, which may also control operation of the acquisition unit 420 itself. The control unit 430 may be configured to communicate through the communication module 440 with processing and remote-control stations (not illustrated).

The user interface 450 may comprise input devices, pointing devices, and a screen for displaying information to a user.

Finally, it is evident that modifications and variations may be made to the electronic device and to the method described, without thereby departing from the scope of the present disclosure.

In particular, in some embodiments the pressure adapter may be used as pressure reducer, instead of pressure as a multiplier. In these cases, the interface of the pressure adapter coupled to the pressure sensor has an area larger than that of the free interface accessible from outside the package.

Furthermore, in any case, a contrast element may be present or not according to what is expedient for the specific use.

The shape and dimensions both of the pressure adapter and of the contrast element, if present, may vary with respect to what has been indicated in the examples described.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pressure sensing assembly comprising:
   a substrate;
   a pressure sensor on the substrate;
   a package including a recess, the substrate and the pressure sensor being embedded in the package; and a pressure adapter having a first interface having a first area that is external to the package, the pressure adaptor having a second interface having a second area embedded in the package, the second interface being a protrusion extending from a first surface that faces the pressure sensor, the protrusion and the first surface being in the recess of the package, the second area being less than the first area, the pressure adapter being configured to transfer a force between the first interface and the second interface so that a pressure at the second interface is different from a pressure at the first interface.

2. The pressure sensing assembly according to claim 1 wherein the pressure adapter is a rigid plate.

3. The pressure sensing assembly according to claim 1 wherein the package is a molded resin material and has an adapter seat that is adjacent to the pressure sensor, a portion of the pressure adapter being located in the adapter seat.

4. The pressure sensing assembly according to claim 3 wherein the adapter seat and the protrusion of the pressure adapter are coupled with a shape fit.

5. The pressure sensing assembly according to claim 1 wherein the pressure sensor is arranged between the substrate and is entirely embedded in the package.

6. A pressure sensing assembly comprising:
a substrate;
a pressure sensor on the substrate;
a package of molded resin material, the package having an adapter seat, the substrate and the pressure sensor being embedded in the package; and
a pressure adapter having a first interface of a first area that is external to the package, the pressure adaptor having a second interface located in the adapter seat, the second interface being a protrusion that extends from a surface of the pressure adapter, the protrusion having a second area, the second area being less than the first area, the pressure adapter being configured to transfer a force between the first interface and the second interface so that a pressure at the second interface is different from a pressure at the first interface, wherein the package of molded resin material is between the surface of the protrusion and the pressure sensor.

7. The pressure sensing assembly according to claim 6, comprising adhesive adapter regions in a gap between a perimeter of the second interface of the pressure adaptor and the package.

8. The pressure sensing assembly according to claim 7 wherein a ratio between Young's modulus of a material forming the adhesive adapter regions and Young's modulus of a material forming the package is less than 1:10.

9. The pressure sensing assembly according to claim 6 wherein the adapter seat comprises a recess in the package.

10. A pressure sensing assembly, comprising:
a substrate having a first surface and second opposite surface;
a pressure sensor coupled the first surface of the substrate;
a package including a recess, wherein the substrate and the pressure sensor is embedded in the package;
a pressure adapter having a first interface external to the package and having a first area, the pressure adaptor having a second interface coupled to the pressure sensor, the second interface being a protrusion that extends from a surface of the pressure adapter, the second interface and the surface of the pressure adapter located in the recess of the package, the protrusion having a second area that faces the pressure sensor, the second area being different from the first area, the pressure adapter being configured to transfer a force between the first interface and the second interface so that a pressure at the second interface is different from a pressure at the first interface; and
a contrast element coupled to the second surface of the substrate, the pressure adapter and the contrast element being aligned with each other.

11. The pressure sensing assembly according to claim 10 wherein the pressure sensor is arranged on a first face of the substrate, and a portion of the contrast element is in contact with a second face of the substrate opposite to the first face in a position corresponding to the pressure sensor.

12. The pressure sensing assembly according to claim 11 wherein the pressure adapter is of a material having a first Young's modulus, a material forming the packaging having a second Young's modulus that is less than the first Young's modulus.

13. The pressure sensing assembly according to claim 10 wherein the contrast element comprises a rigid plate distinct from the rigid plate of the pressure adapter and separated from the substrate by a portion of the package.

14. A structural health monitoring system for buildings, comprising:
a control unit; and
a plurality of pressure sensing assemblies coupled to the control unit and embedded in one or more structures of a building, at least one of the plurality of pressure sensing assemblies including:
a substrate;
a pressure sensor on the substrate;
a package material including a recess, the substrate and the pressure sensor embedded in the package material; and
a pressure adapter located over the pressure sensor, the pressure adapter having a first surface that is external to the package material and a second surface in the recess of the package material, the second surface including a protrusion extending from the second surface, the protrusion facing the pressure sensor, the package material being between the second surface of the pressure adapter and the pressure sensor, the first surface having a first area and the second surface having a second area, the second area being different from the first area.

15. The structural health monitoring system according to claim 14 wherein the second area is smaller than the first area.

16. The structural health monitoring system according to claim 14 wherein the recess is a stepped recess, wherein the second surface and the protrusion are located in the stepped recess of the package material.

17. The structural health monitoring system according to claim 14 wherein the pressure adapter has a Young's modulus that is greater than a Young's modulus of the package material.

18. A pressure sensing assembly comprising:
a pressure sensor;
a package material including a recess, the pressure sensor embedded in the package material; and
a pressure adapter located over the pressure sensor, the pressure adapter having a first surface that is external to the package material and a second surface in the recess of the package material, the second surface including a protrusion extending from the second surface and facing the pressure sensor, wherein the package material is between the second surface of the pressure adapter and the pressure sensor.

19. The pressure sensing assembly according to claim 18 wherein the pressure sensor is fully embedded in the package material, wherein the package material is a molding compound.

\* \* \* \* \*